United States Patent

[11] 3,598,437

| [72] | Inventor | Mary V. Montgomery Harris<br>491 North Highlands Apt. 15, Memphis,<br>Tenn. 38122 |
|---|---|---|
| [21] | Appl. No. | 847,876 |
| [22] | Filed | Aug. 6, 1969 |
| [45] | Patented | Aug. 10, 1971 |

[54] AUTOMOBILE COLLISION GUARD MEANS
4 Claims, 5 Drawing Figs.

| [52] | U.S. Cl. | 293/62 |
|---|---|---|
| [51] | Int. Cl. | B60r 19/08 |
| [50] | Field of Search | 293/60, 61, 62 |

[56] References Cited
UNITED STATES PATENTS

| 285,675 | 9/1883 | Post | 239/337 |
|---|---|---|---|
| 365,939 | 7/1887 | Post | 239/337 |
| 1,473,956 | 11/1923 | Eure et al. | 293/61 |
| 2,441,132 | 5/1948 | Blakey | 293/60 |

*Primary Examiner*—Arthur L. La Point
*Assistant Examiner*—Robert Saifer
*Attorney*—John R. Walker, III

ABSTRACT: Guard bar and rod members are supported from the frame structure of an automobile and are arranged outwardly of the skin of the automobile body at strategic impact-prone areas of the body. The guard structure includes crossbars extending over the top midsection of the automobile operative mainly for preventing damage in an accident overturning the automobile. The guard structure includes also a forward and a rearward guard rod assembly arranged respectively around the front cap and rear deck sections of the automobile and with each assembly being rigidly or resiliently mounted for cushioning impacts forwardly and rearwardly of the automobile.

PATENTED AUG 10 1971
3,598,437
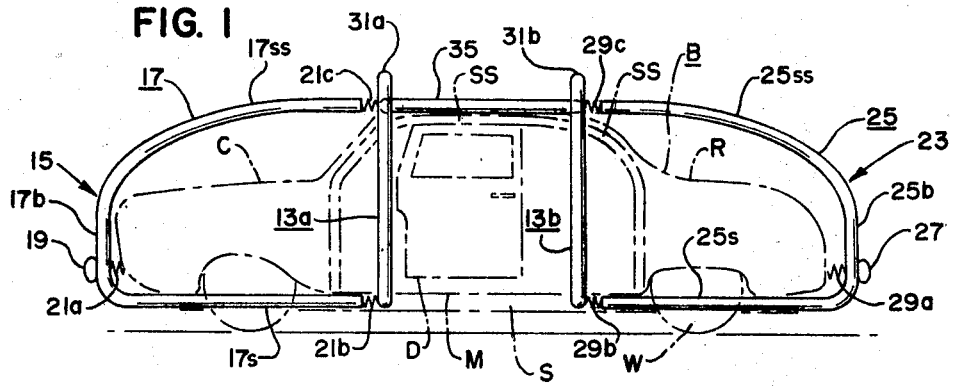
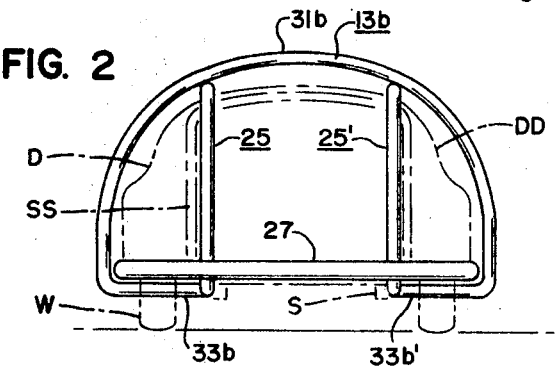
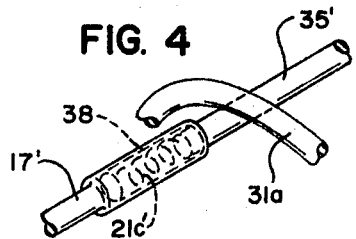
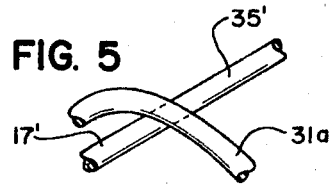
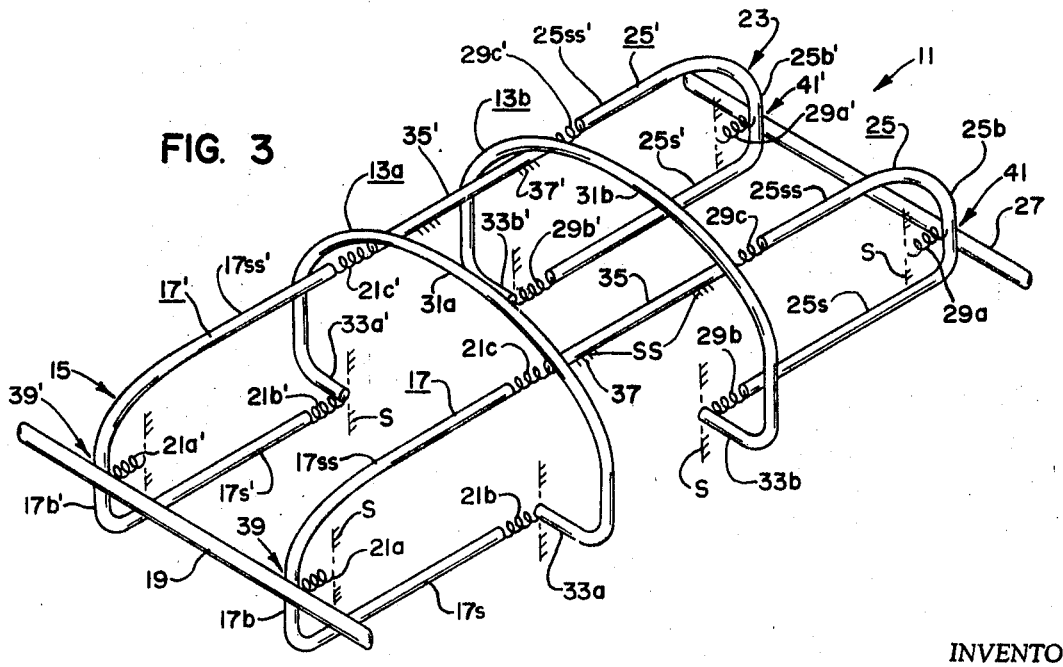
INVENTOR.
MARY V. MONTGOMERY HARRIS
BY John R. Walker, III
Attorney

AUTOMOBILE COLLISION GUARD MEANS

BACKGROUND OF THE INVENTION

1. Field of the Invention

It relates particularly to guard bar structure supported on an automobile and operative for preventing damage to the automobile injury to its occupants in an impact or collision.

2. Description of the Prior Art

Certain prior art devices have heretofore been devised for preventing damage and injury respectively to the automobile and occupants thereof during a collision. U.S. Pat. No. 3,110,515 discloses fender rail structure adapted for placement fully around an automobile body or to be incorporated in the body during manufacture. The fender structure of this patent extends generally horizontally and does not include overhead structure for preventing damage to the automobile or injury to its occupants in the event of an accident overturning the automobile. Moreover, in the fender structure of U.S. Pat. No. 3,110,515, the cushioning effect is obtained by deforming or crushing sheet metal rail projections. Thus, in the event of an accident, the damaged fender rail elements must be replaced or repaired to return the damaged parts and the automobile appearance to its original condition.

SUMMARY OF THE INVENTION

The present invention provides automobile collision guard structure which may optionally be incorporated in an automobile body during manufacture or may be installed on an automobile body of a new or used vehicle. The collision guard structure of the present invention is superjacently arranged over the body midsection and provides effective means for reducing or obviating injury to the occupants or damage to the automobile during an accident overturning the automobile. The guard bar and rail structure of the present invention is resiliently mounted from the automobile frame structure and reduces or absorbs shock forces of a collision without damage to the automobile or guard rail structure thereof, or, optionally the guard bar and rail structure may be rigidly mounted on the automobile. The invention does not rely on the crushing or deforming of sheet metal body or fender parts for cushioning or absorbing impact forces as do certain prior art guard structures. The guard bar structure of the invention is of substantially sturdy simple design and does not include lightweight sheet metal or intricate parts subject to damage or malfunction. The automobile collision guard structure of the invention may be fabricated from readily available parts and may be economically manufactured and marketed.

BRIEF DESCRIPTION OF THE DRAWING

FIG. 1 is a side elevational view of the automobile collision guard means of the present invention illustrated as being mounted on an automobile.

FIG. 2 is a rear elevational view taken as taken from the right of FIG. 1.

FIG. 3 is a perspective view of the guard structure of the invention.

FIG. 4 is a fragmentary view of a portion of the guard structure of FIG. 3 showing a modified form of the joint means.

FIG. 5 is a fragmentary view similar to FIG. 4 showing another modified form of the joint means.

DESCRIPTION OF THE PREFERRED EMBODIMENT

The collision guard structure of the invention is indicated by numeral 11 and will be described in conjunction with an automobile having frame structure including main frame substructure S and upstanding superstructure SS. The automobile typically includes a body B including a passenger-housing intermediate section M, a front cap section C and a rear deck section R.

Automobile collision guard means 11 basically includes a pair of crossbars 13a, 13b arranged generally transversely of the midsection or intermediate section M of automobile body B; a forward guard assembly 15 including left and right side rod members 17, 17' and a front bumper bar member 19; spring members 21a, 21b, 21c, 21a', 21b', 21c' resiliently supporting respectively forward guard assembly 15 from the frame structure of the automobile; a rearward guard assembly 23 including left and right side rod structures 25, 25' and rear bumper bar structure 27; and, spring means resiliently supporting assembly 23 from the automobile frame, including spring members 29a, 29b, 29c, 29a' 29b', 29c'. However, if desired, the forward and rearward guard assemblies 15, 23 may be rigidly fixed relative to each other and the frame of the automobile, as will be described in more detail later in the specification.

Crossbars 13a, 13b each are substantially alike and generally of open loop form including respectively generally semicircular main portions 31a, 31b and respectively converging projecting end portions 33a, 33a'; 33b, 33b'. The crossbars 13a, 13b are generally parallel-arranged and extend in spaced arrangement about body intermediate section M and respectively forwardly and rearwardly of the automobile body left and right door structures indicated respectively D, DD. The confronting end portions 33a, 33a', 33b, 33b' of crossbars 13a, 13b preferably are fixedly secured on fore-and-aft extending frame substructure S (the automobile frame being indicated schematically in FIG. 3 by hash marks). If desired, the crossbars 13a, 13b may respectively be continuous and completely encircle the automobile. In other words, rather than being discontinuous as shown, the portions 33a and 33a' may be integrally joined under the automobile, as well as the portions 33b and 33b'. The upper main portions 31a, 31b respectively of crossbars 13a, 13b are fixedly secured on frame substructure SS preferably by means of longitudinally extending anchor rods 35, 35'. The opposite end portions respectively of left and right anchor rods 35, 35' preferably are rigidly secured to crossbars 13a, 13b and with the anchor rods being attached respectively at anchor points indicated 37, 37' to frame superstructure SS.

Forward guard assembly 15 is arranged forwardly of passenger-housing intermediate section M of body B and is resiliently urged forwardly by helical compression springs 21a, 21b, 21c, 21a', 21b', 21c'. The left and right side rods 17, 17' preferably are U-shaped and include respectively bight portions 17b, 17b' and lower and upper reach portions respectively 17s, 17ss; 17s', 17ss'. The spring members 21c, 21c' may be directly attached to the automobile frame superstructure SS or may be attached indirectly thereto through the forward end portions of anchor rods 35, 35' (as shown in the drawings). Also, the rearward end portions respectively of lower reach elements 17s, 17s' may be attached directly to the frame structure or attached as shown in the drawings, to the confronting end portions 33a, 33a' of forward crossbar 13a.

The upper reach elements 17ss, 17ss' respectively of side rods 17, 17' preferably are spaced respectively upwardly from left and right portions of front cap C of the automobile body structure. Lower reach elements 17s, 17s' respectively of forward guard assembly side rods 17, 17' preferably extend longitudinally underneath the front cap section C of the automobile and inboard respectively of the left and right front wheels of the vehicle. The forward guard assembly 15 is adapted for cushioning collision forces acting on the forward part of the vehicle and in the event of a collision, spring means 21a, 21b, 21c, 21a', 21b', 21c' coact simultaneously. Front bumper bar 19 preferably replaces the typical bumper structure of a vehicle, and in addition to its function as collision guard means, functions also as typical automobile bumper means.

Rearward guard assembly 23 is of construction similar to forward guard assembly 15 and is arranged generally superjacently and subjacently of read deck section R of the automobile body. Left and right side roe structures 25, 25' and rear bumper bar 27 preferably are of rigid integral construction with the bumper bar structure rigidly interconnecting side rods 25, 25'. The rearward guard assembly 23 preferably is guidingly constrained in fore-and-aft movement by spring members 29a, 29b, 29c, 29a', 29b', 29c', just as the forward guard assembly is guidingly constrained in fore-and-aft movement by spring members 21a, 21b, 21c, 21a', 21b', 21c'. Rearward guard assembly 23 and forward guard assembly 15 may be guidingly constrained in fore-and-aft movement by other suitable guide structure which permits resilient springing movement of the assembly 23 fore-and-aft of the automobile. Thus, the joint means at the springs may be telescopic joint means, as for example, like that shown in FIG. 4, wherein it will be seen side rod 17' is enlarged and provided with a socket 38 at the end thereof into which slidably and telescopically fits the end of anchor rod 35'. Spring 21c' is on the interior of socket 38 and extends between the base of the socket and the end of anchor rod 35'.

The upper reach elements 25ss, 25ss' respectively of side rod structures 25, 25' are preferably apaced upwardly above body rear deck section R and connect with spring members 29c, 29c' supported preferably from rearward crossbar 13b. Lower reach elements 25s, 25s' respectively of rod structures 25, 25' are arranged inboard respectively of left and right rear wheels W of the vehicle and connect respectively with spring members 29b, 29b' supported respectively from end portions 33b, 33b' of the rearward crossbar. Spring members 29a, 29a' are interposedly tensioned between bight portions 25b, 25b' of assembly 23 and the rearward end portions respectively of main frame substructure S. The rear bumper bar 27, in addition to functioning as rearward collision guard means, functions also as typical automobile rear bumper means.

In certain embodiments of the invention, it may be desirable to articulatingly or hingedly connect the side rod and bumper bar structures respectively of forward and rearward guard assemblies 15, 23. The side rod and bumper bar connections as indicated by arrows 39, 39', 41, 41' respectively of the forward and rearward assemblies 15, 23 may, if desired, be provided with articulating-connecting means rather than the rigid joint means above defined. Such a construction permits a side rod 17, 17'; 25, 25' of a respective guard assembly 15, 23 to receive an impact translationally longitudinally of the vehicle and to cushion the impact without affecting a corresponding side rod of the assembly. For example, a rearwardly directed impact on the forward left portion of the automobile may drive left side rod structure 17 rearwardly and simultaneously compress spring members 21a, 21b, 21c without substantial movement of right side rod structure 17' and without compressing spring members 21a', 21b', and 21c'.

Also, in certain embodiments of the invention it may be desirable to eliminate the springs 21a, 21a', 21b, 21b', 21c, 21c', 29a, 29a', 29b, 29b', 29c, 29c' and form the collision guard structure 17 rigidly, as for example, as shown in the joint means of FIG. 5. Thus, the end of anchor bar 35' is formed integrally with and as a continuation of rod member 17', with the parts shown in FIG. 5 being fixedly joined, as by welding or the like. With the springs eliminated, it may be desirable in certain embodiments to form the crossbars 13a and 13b respectively in continuous loops, as heretofore described, and to form also the fore-and-aft members in continuous loops. Thus, on the left side of the automobile anchor bar 35 would be integrally formed with rod structures 17 and 25, and portions 17s and 25s would be extended towards one another and integrally joined together. Similarly, on the right side of the automobile anchor bar 35' would be integrally formed with rod structures 17' and 25', and portions 17s' and 25s' would be extended towards one another and integrally joined together.

I claim:

1. Automobile collision guard means adapted for embodiment in an automobile having a wheeled body structure including a passenger-housing intermediate section and front cap and rear deck sections arranged respectively forwardly and rearwardly of said intermediate body section, said automobile collision guard means comprising guard bar means including forward and rearward substantially arcuate crossbars, means supporting said forward and rearward crossbars from said automobile transversely of the intermediate section of said body structure and generally in parallel-spaced arrangement, said forward and rearward crossbars extending outwardly from said body structure and downwardly substantially below the tops of said wheels and within close proximity of the ground surface to provide arcuate surfaces particularly for engaging the ground surface to aid in rolling motions of the automobile during a wreck in which the automobile is caused to turn over, a forward guard assembly including left and right side rods generally parallel arranged and extending forwardly of said forward crossbar around the cap section of the automobile, and a rearward guard assembly including left and right side rods generally parallel arranged and extending rearwardly of said rearward crossbar around the rear deck section of the automobile.

2. Automobile collision guard means adapted for embodiment in an automobile having a wheeled frame means and including body structure including a passenger-housing intermediate section having left and right door members defining access means into the passenger-housing section and said body including front cap and rear deck sections arranged respectively forwardly and rearwardly of said intermediate body section, said automobile collision guard means comprising guard bar means including a forward and rearward crossbar each being generally of open loop form in longitudinal extension, means supporting said forward and rearward crossbars from said frame means transversely of the intermediate section of said body structure, generally in parallel-spaced arrangement and respectively forwardly and rearwardly of said door members, a forward guard assembly including left and right side rods generally parallel arranged and with each rod being generally C-shaped in longitudinal extension, and including a front bumper bar interconnecting the bight portions of said side rods and including means resiliently supporting said forward guard assembly from said frame means with said left and right side rods of said forward assembly being arranged respectively leftward and rightward of said front cap body section, a rearward guard assembly including left and right side rods generally parallel arranged and with each being generally C-shaped in longitudinal extension, and including a rear bumper bar interconnecting the bight portions respectively of the side rails of said rearward guard assembly, and including means resiliently supporting said rearward guard assembly from said frame means with said left and right side rod members being arranged respectively leftward and rightward of the rear deck section of said automobile body, said forward and rearward crossbars and said left and right side rods of said forward guard assembly and said rearward guard assembly extending downwardly substantially below the tops of said wheels and within close proximity of the ground surface to provide arcuate surfaces particularly for engaging the ground surface to aid in rolling motions of the automobile during a wreck in which the automobile is caused to turn over.

3. The automobile collision guard means as defined in claim 2 wherein said forward and rearward crossbars are generally spaced outwardly from the intermediate section of said body and wherein the side rod members respectively of said forward and rearward guard assemblies are spaced outwardly respectively from the front cap and rear deck sections of the automobile body.

4. The automobile collision guard means as defined in claim 3 wherein said means resiliently supporting said forward and rearward guard assemblies include helical compression springs interposedly operative respectively between said forward and rearward guard assemblies and said frame means and resiliently urging said forward guard assembly forwardly and said rearward guard assembly rearwardly in relation to said automobile body.